Sept. 17, 1935. C. W. VAN RANST 2,014,751
VEHICLE WHEEL
Filed March 21, 1932
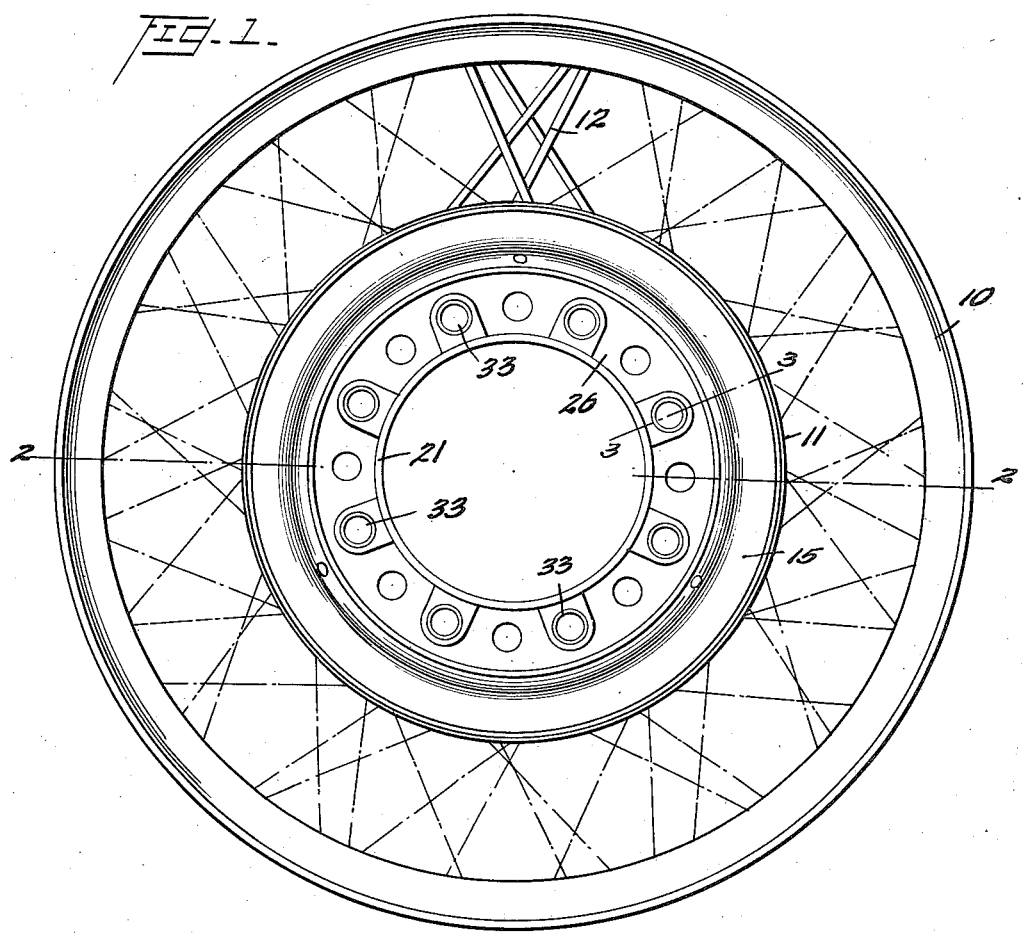
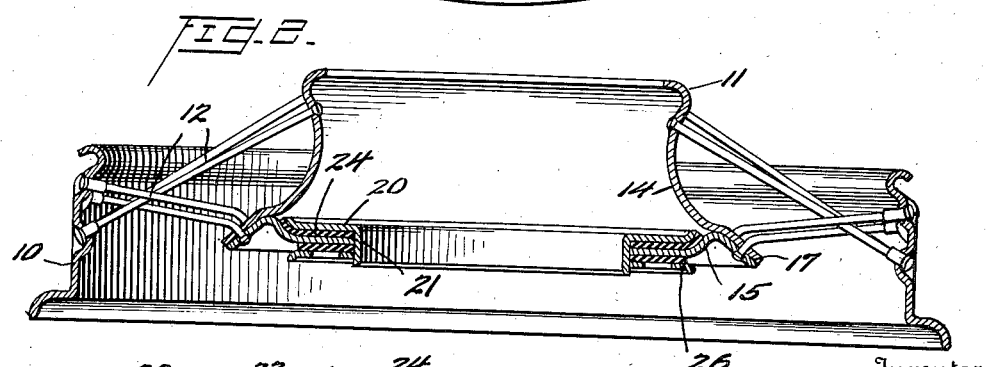
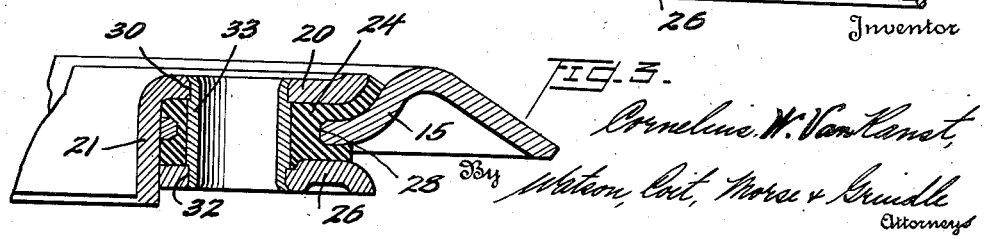

Patented Sept. 17, 1935

2,014,751

UNITED STATES PATENT OFFICE 2,014,751

VEHICLE WHEEL

Cornelius W. Van Ranst, Detroit, Mich., assignor to Packard Motor Car Company, Detroit, Mich., a corporation of Michigan Application March 21, 1932, Serial No. 600,349

6 Claims. (Cl. 301—9)

This invention relates to vehicle wheel assemblies and has for its object the provision of means for increasing the resistance of the wheel assembly to shock and for eliminating objectional vibration thereof.

It has been found, for instance, that the tendency of front vehicle wheels to shimmy is due largely to the gyroscopic effect produced in the rapidly rotating and relatively heavy wheel, the lateral thrust repeatedly exerted in opposite directions on that portion of the wheel in contact with a road bed of irregular contour giving rise to a vibrational movement of the wheel at right angles to the direction of thrust, namely about a substantially vertical axis. This tendency to shimmy is not readily overcome by providing means for damping the vibrations intermediate the rim portion and the hub portion of the wheel since vibrations may be induced in that portion of the wheel lying radially inward of the damping means but having considerable inertia about the pivotal axis of the wheel.

It is therefore an object of the invention to incorporate means within the hub member of the wheel for absorbing energy resulting from vibration of the wheel assembly or any portion thereof induced or initiated by lateral thrust.

A more specific objection of the invention is the provision in a wheel assembly including a rim and a hub, of relatively movable hub portions, one serving as a support for the rim and spokes or other rim supporting means and the other being carried by the vehicle, and deformable energy absorbing means acting between the hub portions to resist relative lateral movement thereof. The energy absorbing means preferably comprises an elastic material developing considerable internal friction when subjected to compression such as rubber.

A further object of the invention is the provision in a vehicle wheel assembly of a hub comprising relatively laterally movable rim supporting and vehicle carried members so engaged as to positively prevent relative radial movement thereof, and deformable energy absorbing means interposed between the members to resist relative lateral movement of any portions thereof.

Preferably the deformable means is so arranged as to further resist relative circumferential movement of the members comprising the hub, this arrangement being particularly suitable in wheel assemblies designed for use with motor vehicles of the front wheel drive type in which it is desirable to cushion the load and shocks at some point between the source of power and the road engaging portion of the wheel by reason of the absence of the long and relatively elastic propeller shaft employed with the rear wheel drive.

Further objects and features of the invention will be apparent from the following description taken in connection with the accompanying drawing, in which:

Figure 1 is an elevational view of a vehicle embodying the principles of the present invention;

Figure 2 is a sectional view on the line 2—2 of Figure 1; and

Figure 3 is a sectional view on the line 3—3 of Figure 1.

It will be observed that the invention has been shown as applied to a vehicle wheel of the demountable type in which wire spokes are employed, but it is obvious that the invention is equally applicable to other types of wheels. For instance, the wheel may be of the disc type and it is not essential that provision be made for demounting the wheel. Thus, to facilitate an understanding of the invention, specific language is used in describing the preferred embodiment shown herein but no limitation of the scope of the invention is thereby intended.

Referring to Figure 1, the wheel assembly is shown as comprising a rim 10, a hub 11, and spokes 12 for supporting the rim on the hub, the relationship of these parts being conventional. The outer portion of the hub 11 preferably comprises two elements 14 and 15 welded together as indicated at 17 to which the spokes 12 are secured. Elements 14 and 15 of the hub constitute one of the two relatively movable hub members hereinbefore described, the other hub member being indicated by the reference numeral 20.

It will be observed that the portion 15 of the hub extends radially inward and is provided with a circular opening therein which receives an axially extending flange portion 21 on the member 20, the engagement between the members 15 and 20 being of such nature as to permit free relative circumferential movement thereof but to prevent relative radial movement.

Deformable means is interposed between these members to resist lateral movement, the deformable means preferably comprising an annular member 24 of rubber or similar material seating on the flange portion 21 of the member 20. The member 15 extends within the annular deformable member 24 and is laterally spaced thereby from the radially extending portion of the member 20 and from an annular radially extending member 26 which is received on the axially extending flange portion 21 of the member 20 and which is secured to the latter by means about to be described.

The deformable member 24 is preferably molded in position in the hub and may be secured, if of rubber, by vulcanizing the same to the engaging surfaces of the members 20, 26, and 15. The member 15 is provided with apertures 28 therein at a plurality of points spaced circumferentially of the wheel assembly, the deformable member extending completely through these apertures as shown in Figure 3 of the drawing. The members 21 and 26 are also provided with apertures 30 and 32 respectively to receive bushings 33 which are upset or riveted over at their outer ends to rigidly secure the members 26 and 20 together. These bushings further define openings in the hub through which bolts may be passed to secure the hub to the bearing member carried by the vehicle axle to provide the conventional removable wheel mounting.

It will be seen that by this construction relative lateral movement of the component parts of the hub is permitted, such movement serving to deform or compress the annular member 24. If this member is of rubber or similar material capable of developing considerable internal friction in response to deformation, any lateral vibration of the wheel assembly will be rapidly absorbed and dissipated in the form of heat. It is important to note that this absorption of energy takes place at a point closely adjacent the wheel axis by reason of the incorporation of vibration damping means in the hub and thus any mass having appreciable inertia about the axis of the wheel is effectively damped so that shimmy of the wheel resulting from vibrational disturbances is eliminated. Furthermore, as will be evident from Figure 3 of the drawing, a slight circumferential cushion effect is obtained, torque being transmitted through the deformable member 24 which is thereby compressed between the member 15 and the bushings 33.

Having thus described the invention, what is claimed as new and desired to be secured by Letters Patent is:

1. In a wheel assembly, the combination with a rim, of a hub, and means for supporting the rim on the hub, said hub comprising relatively movable members, one of said members including an annular axially extending portion and spaced, outwardly extending flange portions, the other of said members including a flange portion extending inwardly between said outwardly extending flange portions and having a centrally arranged aperture affording a bearing on the annular axially extending portion of said first named member, vibration damping means interposed between said flange portions and resisting relative lateral movement thereof, said outwardly extending flange portions being apertured at a plurality of points spaced circumferentially thereof, and bushings extending through said apertures for receiving wheel attaching bolts, said bushings being coupled to both flange portions to resist separation of the latter.

2. In a wheel assembly, the combination with a rim, of a hub, and means for supporting the rim on the hub, said hub comprising relatively movable members, one of said members including an annular axially extending portion and spaced, outwardly extending flange portions, the other of said members including a flange portion extending inwardly between said outwardly extending flange portions, vibration damping means interposed between said flange portions and resisting relative lateral movement thereof, said outwardly extending flange portions being apertured at a plurality of points spaced circumferentially thereof, and bushings extending through said apertures for receiving wheel attaching bolts, said bushings being upset adjacent said apertures to secure the outwardly extending flange portions together.

3. A hub for vehicle wheels comprising an annular portion of substantially U-shaped section adapted to be carried by the vehicle, an annular rubber element seated in said annular portion, a rim supporting portion extending within said annular portion and embedded in the rubber, and bushings for receiving wheel attaching bolts, said bushings extending between and connected with the two sides of said annular U-shaped portion to tie the same together.

4. In a vehicle wheel assembly, the combination with a rim, of a hub, and means for supporting the rim on the hub, said hub comprising a plurality of members relatively movable laterally of the wheel assembly and having direct engagement circumferentially to prevent relative radial movement thereof, vibration damping means including rubber extending radially between said members to resist relative lateral movement thereof and extending within openings in one of said members to provide the sole medium for transmitting torque between said members, and bushings carried by the other of said members and extending through the openings in the other of said members and through the rubber therein, said bushings being dimensioned to receive wheel attaching bolts.

5. In a vehicle wheel assembly, the combination with a rim, of a hub, and means for supporting the rim on the hub, said hub comprising a plurality of relatively movable members having circumferential cooperating bearing portions, one of said members having apertures therein, bushings carried by the other of said members and extending through said apertures, said bushings being dimensioned to receive wheel attaching bolts, and elastic means surrounding said bushings and interposed between each of the latter and the walls defining the associated aperture, said elastic means serving to transmit all torque between said members.

6. In a vehicle wheel assembly, the combination with a rim, of a hub, and means for supporting the rim on the hub, said hub comprising a plurality of relatively movable members having circumferential cooperating bearing portions, one of said members having apertures therein, bushings carried by the other of said members and extending through said apertures, said bushings being dimensioned to receive wheel attaching bolts, and elastic vibration damping means including rubber interposed between each of the latter and the walls defining the associated aperture, said elastic means serving to transmit all torque between said members.

CORNELIUS W. VAN RANST.